United States Patent Office

3,756,832
Patented Sept. 4, 1973

3,756,832
BREAD INCLUDING LARGE AMOUNT
OF NON-WHEAT PROTEIN
Sidney K. Wolf, Hillsdale, N.Y., and Robert M. Cavanaugh, Greenville, Del., assignors to International Food Technology Inc., Hillsdale, N.Y.
No Drawing. Filed May 19, 1972, Ser. No. 255,079
Int. Cl. A21d 2/26, 13/06
U.S. Cl. 99—90 HP                                                   7 Claims

ABSTRACT OF THE DISCLOSURE

Large amounts of a highly proteinaceous non-wheat protein source are incorporated in bread dough. Corn flour or corn meal is also utilized in the dough to mask the non-wheat flour taste imparted by utilizing the non-wheat protein in the bread, such as the bitter taste and beany taste associated with the use of soy as a non-wheat protein source. The non-wheat proteins are those such as soy, fish, or the like, which are rich in at least one amino acid, such as lysine, in which wheat protein is deficient.

BACKGROUND OF THE INVENTION

The present invention relates to bread including a substantial amount of non-wheat protein. More particularly, the invention relates to bread including large amounts of a highly proteinaceous non-wheat protein relatively rich in at least one essential amino acid, such as L-lysine, in which wheat protein is relatively deficient.

Many years ago it was demonstrated that wheat protein is deficient in L-lysine. It has therefore been proposed to add L-lysine to bread formulations and, more recently, to add less expensive L-lysine sources such as soy flour or the like. Similarly, it has been proposed to add non-wheat protein sources to supply other essential amino acids such as threonine, methionine, and the like in which wheat protein is relatively deficient. There are, however, two basic problems which result from the use of non-wheat protein in bread in an amount sufficient to substantially alter the protein quality. First, the non-wheat protein, being non-glutenaceous, "burdens" the dough formulation resulting in bread having poor physical characteristics. Second, the non-wheat protein imparts a non-wheat taste which, in the case of the otherwise most eminently suitable wheat flour substitutes—namely soy flour and/or fish flour—is very objectionable, particularly where the non-wheat proteins are used in a relatively large amount of at least 6 percent by weight based on the weight of the wheat flour.

The first problem is met by using a lesser amount of non-wheat protein (with consequent reduction in the improvement of protein quality) and/or using special additives which enhance tolerance for non-wheat protein. The second problem however, is one which is largely unsolved.

It is an object of the present invention to provide bread having large amounts of non-wheat protein. It is a further object to provide such bread having at least 6 percent by weight, based on the weight of wheat flour, of one or more highly proteinaceous non-wheat protein sources. By "highly proteinaceous" is mean that at least 50 percent by weight of the protein source is protein. It is still a further object to provide such bread which is free from the disadvantages noted above.

BRIEF SUMMARY OF THE INVENTION

The foregoing and other objects of the present invention are achieved by providing a bread dough including wheat flour as the principal ingredient, a highly proteinaceous non-wheat protein source in an amount of from 6 to 15 percent by weight based on the wheat flour weight, and including corn flour or corn meal in an amount of from 1 to 8 percent by weight, based on the wheat-flour weight. Carboxymethylcellulose and/or one or more other permitted food additives may be used to assist the formulation to tolerate the burden imposed by the non-wheat protein, and the corn flour or meal masks the non-wheat flavor imparted by the non-wheat protein without, however, introducing a characteristic corn taste.

DETAILED DESCRIPTION

The bread to which the invention relates may be any conventional bread based on wheat flour, and may be made in any conventional way such as straight dough, sponge dough, "no-time" dough, continuous mix, and known variations of these basic methods. The wheat flour used in the formulation is conventional wheat flour for bread making. While the dough is referred to herein as bread dough, it will be apparent that the dough is useful for making buns, rolls, and the like.

While wheat flour has the unique property of forming gluten gel when mixed with water, a feature essential to bread making, the ratio of utilizable-protein calories to total calories (called "protein quality") is low. It has been recognized for many years that this ratio can be increased by adding to the bread formulation one or more of the essential amino acids in which wheat protein is deficient. The largest deficiency is in respect to L-lysine and, by adding L-lysine to the bread formulation, the utilizable protein of the bread is increased and the ratio of utilizable-protein calories to total calories is increased by more than the amount added by the L-lysine. After the deficiency of L-lysine is eliminated, another essential amino acid deficiency becomes controlling and a further increase in protein quality is obtained by adding that particular acid. Addition of the acids themselves is inherently expensive and, furthermore, since wheat protein is reatively deficient in several essential amino acids, it would be preferable to add a raw protein source and, in particular, one which is relatively rich in those essential amino acids which are relatively deficient in wheat protein. The most efficient raw proteins, from a technical point of view, would be those which were rich in those essential amino acids in an amount proportional to their deficiency in wheat protein. However, cost factors are of much more importance. Accordingly, the non-wheat protein sources used in the bread dough formulation are those which are relatively rich, upon hydrolysis, in essential amino acids in which wheat protein is relatively deficient. By "relatively rich" and "relatively deficient" are meant the amount of the acids in question relative to that which can be utilized by a human consuming the protein in question. In other words, a protein rich in L-lysine includes an amount of L-lysine above the amount in a given protein which can be utilized by a human consuming that protein. Preferably, the non-wheat protein is relatively rich primarily in L-lysine and the present preferred non-wheat proteins are soy and fish.

Soy is the preferred non-wheat protein source and soy flour is the preferred soy material. Any of the conventional edible grades of soy flour may be used ranging in fat content from 18 or 22 percent by weight fat, in the full fat grade to 1 percent or less in the defatted flours. Where fish is used, fish protein concentrate is the preferred fish material and any edible grade may be used. It is preferable to use defatted soy flour, although full fat soy flour can be used since it is available as a stable, finely milled flour. It is preferable that the soy flour be toasted, as toasting improves its flavor and renders it more digestible by inactivating antitrypsin enzymes usually present in soy flour. The term "soy flour" as used in the present discussion includes defatted and full fat soy flour, soy protein concentrates and isolated soy protein, preferably milled to a partical size which will pass through an 80 mesh screen (U.S. standard).

The corn used according to the invention can be any edible grade, including corn flour and corn meal. Corn flour is preferred and, if corn meal is used, it is preferably used in an amount of from 1 to 4 percent by weight.

It has been known for some time that the addition of a non-wheat protein, such as soy flour, into a broad formulation, "burdens" the bread which results in poor physical and eating qualities. Large quantities of soy flour, for example, cannot be readily incorporated into a bread dough formualtion. However, it will be remembered that the object of adding the non-wheat protein is to add a source of essential amino acid in which the additive is rich and in which the wheat protein is deficient. This means, in practice, that relatively large amounts of non-wheat protein, generally at least 6 parts by weight per hundred parts by weight of wheat flour, must be added to obtain a substantial increase in protein quality. The addition of this large amount of non-wheat protein generally results in poor bread quality and various additives, generally classed as "conditioners," "emulsifiers" or "softeners" in the baking industry, have been proposed to remedy this defect. Among the proposed additives are sodium stearoyl-2-lactylate and calcium stearoyl-2-lactylate. However, these are expensive materials and they are used in relatively large amounts. It is therefore preferred to use materials which can be used in lesser amounts and/or at lesser expense. We have found several other materials which can be so used including conventional mono- and diglyceride bread additives such as "Atmul 500" and cellulose ethers such as sodium carboxymethylcellulose in amounts up to 0.5 percent based on the wheat flour weight.

The bread formulation also preferably includes essential vitamins and minerals to provide an enriched bread. Several examples of bread formulations according to the invention will now be described.

Examples 1 and 2

Bread according to the invention is made by the sponge dough technique from the following formulation:

|  | Percent by weight based on wheat flour weight |
|---|---|
| Sponge (ingredients): |  |
| Wheat flour | 62.5 |
| Water | 46.0 |
| Yeast food (flour, salt, NC$_4$Cl, CaSO$_4$, KBrO$_3$) | 0.5 |
| Yeast | 2.5 |
| Dough (ingredients): |  |
| Wheat flour | 37.5 |
| Water | 36.0 |
| Sugar (sucrose) | 7.0 |
| Salt (regular) | 2.0 |
| Shortening (vegetables) | 3.0 |
| Ca propionate | 0.1 |
| Hofmann-La Roche vitamin mix | 1.25 |
| L-lysine monohydrochloride (Ajinomoto) | .25 |
| Fish protein concentrate (U.S. Department of Commerce 90% protein) | 2.0 |
| Nonfat dry milk | 2.0 |
| Soy flour (Central Soya "Textrol") | 6.0 |
| Corn flour ("Ceradex 265" Illinois Cereal Mills) | 5.0 |
| Emulsifier ("Atmul 500" Atlas Chemical Products) | 0.2 |
| Sodium CMC (DuPont P-95-SM carboxymethylcellulose) | 0.1 |

The process conditions are as follows:

Sponge formulation time: 4 hours
Sponge temperature (into fermenter): 78° F.
Sponge temperature (out of fermenter): 84° F.
Dough mixing time: 7 minutes
Dough temperature: 85° F.
Dough proofing time: 55 minutes
Dough scaling weight: 430 grams The dough is baked at 400° F. for 18 minutes. The baked bread weighs 487 grams with a volume of 1900 cc., or a vol./wt. ratio of 4.90; crum color is yellow; grain is rather open with round cells. The flavor is level without noticeable soy taste, fish taste, or corn taste. A second sample is made in the same manner except that the corn flour is omitted. Process conditions are substantially identical. The baked bread has a noticeably non-wheat flour taste imparted by the soy and fish flour.

Examples 3 and 4

Bread according to the invention is made by the sponge dough technique from the following formulation:

|  | Percent by weight based on wheat flour weight |
|---|---|
| Sponge (ingredients): |  |
| Wheat flour | 62.5 |
| Water | 46.0 |
| Yeast food | 0.5 |
| Yeast | 2.5 |
| Dough (ingredients): |  |
| Wheat flour | 37.5 |
| Water | 36.0 |
| Sugar "Cerelose," dextrose) | 8.5 |
| Salt (regular) | 2.25 |
| Sortening (vegetable) | 3.0 |
| Ca propionate | 0.25 |
| Roche vitamin mix | 1.25 |
| L-lysine HCl (Ajinomoto Co.) | 0.25 |
| Fish protein concentrate (U.S. Department of Commerce) | 2.0 |
| Soy flour ("Textrol," Central Soya) | 7.0 |
| Corn flour ("Ceradex" Illinois Cereal Mills) | 5.0 |
| Sodium CMC (DuPont P-95-SM) | 0.2 |

The processing conditions are as follows:

Sponge fermentation time: 4 hours
Sponge temperature (out): 85.5° F.
Dough mixing time: 7 minutes
Dough temperature: 82° F.
Average proofing time: 54 minutes
Bake time: 18 minutes at 400° F.

Results are similar to those of Example 1. A fourth example is made in the same manner as Example 3 except that the corn flour is omitted. The process conditions are substantially the same and the results are similar to Example 3; there is a noticeable "penetration" of soy and fish protein taste which is lacking in the baked bread of Example 3.

Examples 5 and 6

Bread is made according to the straight dough method from the following formulation:

|  | Percent by weight based on wheat flour weight |
|---|---|
| Brew (ingredients): |  |
| Water | 68 |
| Salt | 0.75 |
| Sugar | 1.0 |
| Yeast | 2.5 |
| Yeast food | 0.66 |

The brew is left for 1 hour and 45 minutes during which time the temperature rises from 80 to 87° F. with about 2.0 percent weight loss. The pH is monitored by litmus and is about 4.9. The brew is then placed in the mixer with the remainder of the formulation as follows:

Brew:

| | |
|---|---:|
| Water _____ lbs__ | 20 |
| Flour _____ lbs__ | 100 |
| Sugar _____ | 7.5 |
| Salt _____ | 1.50 |
| Shortening _____ | 3.0 |
| Ca propionate _____ | 0.25 |
| La Roche vitamin mix _____ | 1.25 |
| L-lysine monohydrochloride _____ | 0.25 |
| Soy flour ("Textrol") _____ | 10.0 |
| Corn flour ("Ceradex 265") _____ | 5.0 |
| CMC (P-75-SM) _____ | 0.2 |
| Emulsifier ("Xpando," a polyoxyethylene glyceride type) _____ | 0.25 |
| $KBrO_3$ wafer _____ | (1) |

[1] 60 parts by weight per million parts by weight of wheat flour.

The formulation is mixed for one minute at low speed and to "clean up" (10 minutes) at high speed. Dough temperature is 80–82° F. The dough is proofed for 60 minutes at 105° F., 90 percent relative humidity and baked for 10 minutes at 425° F. Results are similar to those of Example 3. The baked bread is free of any penetration of flavor of soy or corn. A sixth sample is made as in Example 5 except that the corn flour is omitted. The baked bread has the characteristic color and beany taste associated with breads having 10 percent by weight of soy flour.

Example 7

Bread is made by the straight dough method as in Example 5, with the following changes:

(1) Corn flour is 7 percent
(2) Soy flour is 8 percent and "Ardex 550," a 52 percent protein soy, is used
(3) Gluten flour, in an amount of 1 percent, is added to the mix
(4) "Sour dough base," in an amount of 1 percent, is added to the mix ("Sour dough base" is a mold inhibitor sold by Breddo Food Products Corporation). The bread is very good in appearance and eating quality. A very slight corn taste is detectable, but no beany taste is noticeable. Loaf volume is very good.

Example 8

Bread is made as in Example 7 with the following changes:

(1) Corn flour is 3 percent
(4) Soy flour is 12 percent

The beany taste of the soy is noticeable and the crumb is sticky. Loaf volume, however, is very good.

In the previous examples, pre-gelatinized corn flour is employed. In several of the following examples, other forms of corn are employed.

Example 9

Bread is made as in Example 8 except for the following changes:

(1) Corn meal is substituted for corn flour, the amount of corn meal being 5 percent
(2) Soy flour is 8 percent
(3) Gluten flour is omitted
(4) CMC is increased to 0.25 percent
(5) High speed mixing is 12 and one half minutes The bread has a noticeable yellow color and corn taste but has good loaf volume, good eating properties and no beany taste.

Example 10

Bread is made as in Example 9 except for the following changes:

(1) Pre-gelatinized corn flour, in an amount of 5 percent, is substituted for the corn meal.
(2) The soy is changed to "Nutri Soy," a 53 percent protein soy produced by ADM Results are excellent. The bread has good loaf volume, color and flavor.

Example 11

Bread is made as in Example 10 except for the following changes:

(1) The amount of sugar is increased to 10 percent
(2) The amount of L-lysine is increased to 0.3 percent Results are excellent. A production bread sample made in a commercial bakery equipment contains 12.3 percent protein, 42.1 percent water and has a protein efficiency ratio (PER) of 2.29 as compared to a casein value of 2.68 for control animals. Loaf volume, color, and taste are also very good. The yield from 165 pounds of wheat flour is three hundred and two one pound loaves.

Example 12

Bread is made as in Example 11 except for the following changes:

(1) Dry milled yellow corn flour is substituted for the pre-gelatinized corn flour
(2) A 52 percent soy flour ("200-T" Central Soya) is substituted for the Nutri Soy
(3) The "sour dough base" is omitted Results are similar to Examples 10 and 11. The color, surprisingly, is similar to Examples 10 and 11. The dough gives a one kilogram loaf of bread in a standard 2 pound "Pullman loaf" size pan and this loaf is scored 94.40 by the QBA method in which it is judged superior in flavor and eating quality. Two defects (crust and holes in the grain) were also noted in the test but these are easily correctable by baking techniques. The net result of having two plusses and two defects is an average score and the loaf can be made above average by changing processing techniques, such as baking temperature and mixing time, in a known manner.

Example 13

Bread is made as in Example 12 except that the amount of corn flour is reduced to 1 percent. Bread quality is good except that there is a noticeable beany taste.

Example 14

Bread is made by the "no-time" dough method from the following formulation:

| Ingredient: | Percent by weight based on flour weight |
|---|---:|
| Wheat flour (with 100 p.p.m. ascorbic acid) __ | 100 |
| Corn flour (Ceredex 265) _____ | 4.55 |
| Soy flour (Ardex 550) _____ | 7.74 |
| Cane sugar _____ | 7.28 |
| Salt _____ | 1.82 |
| Shortening (margarine) _____ | 2.73 |
| Yeast _____ | 2.73 |
| L-lysine HCl _____ | 0.27 |
| CMC _____ | 0.23 |
| Ca propionate _____ | 0.27 |
| Roche vitamin mix _____ | 1.09 |
| Water _____ | 89 |
| Conditioner ("Hacko–200", a polyoxyethylene glyceride conditioning emulsifier) _____ | 0.23 |
| Yeast food _____ | 0.68 |

The dough is mixed for three and one half minutes (115 watt hours) in a Tweedy Co. mixer (Model No. 280 fitted with its internal wall baffles and bread making agitator plates). The dough is then divided, rounded, overhead proofed for 12 minutes, molded, panned, and baked 22 minutes at 405° F. Results are excellent.

All of the bread produced in accordance with the invention meets the objective of 12 percent minimum for utilizable-protein calories based on total calories. Some bread samples are as high as 18 percent. Furthermore, bread in accordance with the invention toasts very well.

As mentioned above, a principal object of the invention is to provide a bread having enhanced protein quality (i.e. the ratio of utilizable protein calories to total calories in the bread). In general, it is desirable to at least double this ratio and, in order to do so, the amount of non-wheat proteinaceous source will be between 6 and 15 percent by weight based on the wheat flour weight. The amount of corn flour used according to the invention will be from 1 to 8 percent by weight, same basis. Where corn meal is used, the maximum amount is preferably 4 percent. The preferred non-wheat protein includes soy and fish and preferred amounts of these are between 6 and 12 percent by weight, in which case the amount of corn flour is preferably from 2 to 6 percent by weight.

Essential amino acids can also be added and L-lysine is preferred. In general, L-lysine may be added in an amount of up to 1 percent by weight based on the wheat flour weight, and preferably in an amount of up to ½ percent by weight.

As indicated in the examples, essential vitamins and minerals may be added to the dough.

Compared with standard breads, bread produced by the present invention is lower in calories and higher in vital protein-building nitrogen. It has a much higher (12 percent) ratio of usable-protein to total calories. It also may be enriched with all of the 19 essential vitamins and minerals listed in the Federal Register, Mar. 30, 1972 by the Food and Drug Administration from the National Academy of Sciences "Recommended Dietary Allowances." Analysis of a typical bread in accordance with the invention is shown in the following table:

| Nutrient | One-meal serving (two-slices) | Daily intake eight slices |
|---|---|---|
| Vitamin A | 10 | 40 |
| Vitamin C | 15 | 50 |
| Thiamine (Vitamin B₁) | 15 | 60 |
| Riboflavin (Vitamin B₂) | 10 | 50 |
| Niacin | 10 | 40 |
| Calcium | 10 | 30 |
| Iron | 15 | 50 |
| Vitamin D | 10 | 40 |
| Vitamin E | 10 | 30 |
| Vitamin B₆ | 10 | 40 |
| Folacin (Folic Acid) | 10 | 30 |
| Vitamin B₁₂ | 10 | 30 |
| Biotin | 10 | 30 |
| Pantothenic acid | 10 | 30 |
| Phosphorus | 10 | 30 |
| Iodine | 10 | 40 |
| Zinc | 10 | 30 |
| Magnesium | 10 | 40 |
| Copper | 15 | 50 |

Fraction of recommended dietary allowance, percent

The protein quality of a typical bread loaf in accordance with the present invention is indicated in the following table:

| Contents | One meal, 2 slices (approx. 2 ounces, or 57 grams) | Daily intake, 8 slices (approx. 8 ounces, or 227 grams) |
|---|---|---|
| Calories | 130 | 510 |
| Grams total protein | 6 | 23 |
| Grams casein-equivalent protein | 5 | 18 |
| Grams fat | 2 | 6 |
| Grams available carbohydrate | 23 | 91 |

Serving size

As mentioned above, soy is the preferred non-wheat protein source and defatted soy flour having a protein content of at least 50 percent is the preferred soy material.

Vitamin C (ascorbic acid) may be sprayed onto the bread as an aqueous solution after slicing and before packaging. The package in this case is a gas tight plastic film such as polyolefin film. In order to preserve the ascorbic acid from oxidation, the package is preferably provided with an atmosphere of inert gas such as nitrogen. In normal practice, the empty packages are opened with air prior to insertion of the bread loaf. Nitrogen is preferably provided in the package by using nitrogen, in lieu of air, to inflate the empty package.

What is claimed is:

1. A bread dough comprising wheat flour, a highly proteinaceous non-wheat protein source comprising at least 50% of a protein selected from the group consisting of bean protein and fish protein in an amount of from 6 to 12 percent by weight based on the weight of wheat flour, and a corn material selected from the group consisting of corn meal and corn flour in an amount of from 2 to 6 percent by weight based on the weight of the wheat flour, the flavor of bread made from said dough being without noticeable flavor of said protein source or of said corn material.

2. A bread dough according to claim 1 wherein said corn material is corn flour.

3. A bread dough according to claim 2 wherein said corn flour is pre-gelatinized corn flour.

4. A bread dough according to claim 2 wherein said corn flour is dry milled corn flour.

5. A bread dough according to claim 1 wherein said protein is soy protein.

6. A bread dough according to claim 5 wherein said soy protein comprises soy flour.

7. A bread dough according to claim 1 including up to 0.5 percent by weight based on the wheat flour weight, of sodium-carboxymethylcellulose.

References Cited

UNITED STATES PATENTS

| 2,086,184 | 7/1937 | Haas | 99—90 HP |
| 3,615,677 | 10/1971 | Scharschmidt et al. | 99—85 |
| 3,676,150 | 7/1972 | Glicksman et al. | 99—90 R |

RAYMOND N. JONES, Primary Examiner

J. R. HOFFMAN, Assistant Examiner

UNITED STATES PATENT OFFICE
CERTIFICATE OF CORRECTION

Patent No. 3,756,832                     Dated September 4, 1973

Inventor(s) Sidney K. Wolf and Robert M. Cavanaugh

It is certified that error appears in the above-identified patent and that said Letters Patent are hereby corrected as shown below:

Column 1, line 62, delete "mean" and insert --meant--.

Column 2, line 37, delete "reatively" and insert --relatively--.

Column 3, line 8, delete "broad" and insert --bread--.

Column 3, line 49, delete "$NC_4Cl$" and insert --$NH_4Cl$--.

Column 3, line 56, delete "(vegetables)" and insert
  --(vegetable)--.

Column 4, line 8, delete "crum" and insert --crumb--.

Column 4, line 7, delete "487" and insert --387--.

Column 4, line 31, delete ""Cerelose," and insert --("Cerelose"--

Column 5, line 46, delete "appearane" and insert --appearance--.

Signed and sealed this 5th day of March 1974.

(SEAL)
Attest:

EDWARD M. FLETCHER, JR.                  C. MARSHALL DANN
Attesting Officer                        Commissioner of Patents